(12) United States Patent
Rudnick

(10) Patent No.: US 7,295,989 B2
(45) Date of Patent: Nov. 13, 2007

(54) METHOD AND SYSTEM FOR PROVIDING DIRECT AND INDIRECT SALES CHANNELS FOR GOODS OR SERVICES FROM A SINGLE POINT OF PURCHASE

(76) Inventor: Alan Rudnick, 100 E. Linton Blvd., 304B, Delray Beach, FL (US) 33483

( * ) Notice: Subject to any disclaimer, the term of this patent is extended or adjusted under 35 U.S.C. 154(b) by 631 days.

(21) Appl. No.: 09/752,751

(22) Filed: Dec. 30, 2000

(65) Prior Publication Data

US 2001/0032113 A1    Oct. 18, 2001

Related U.S. Application Data

(60) Provisional application No. 60/200,370, filed on Apr. 28, 2000.

(51) Int. Cl.
 *G06F 9/44* (2006.01)
(52) U.S. Cl. .............................. 705/7; 26/28
(58) Field of Classification Search ............ 705/26–27, 705/7, 8, 28
See application file for complete search history.

(56) References Cited

U.S. PATENT DOCUMENTS

| | | | | |
|---|---|---|---|---|
| 4,799,156 A | * | 1/1989 | Shavit et al. ................. | 705/26 |
| 5,758,328 A | * | 5/1998 | Giovannoli ................ | 705/26 |
| 5,797,127 A | | 8/1998 | Walker et al. | |
| 5,842,178 A | * | 11/1998 | Giovannoli ................ | 705/26 |
| 5,889,863 A | * | 3/1999 | Weber ......................... | 705/76 |
| 5,960,411 A | * | 9/1999 | Hartman et al. .............. | 705/26 |
| 5,978,779 A | | 11/1999 | Stein et al. | |
| 6,014,644 A | | 1/2000 | Erickson | |
| 6,058,379 A | | 5/2000 | Odom et al. | |
| 6,081,789 A | | 6/2000 | Purcell | |
| 6,085,176 A | | 7/2000 | Woolston | |
| 6,108,639 A | | 8/2000 | Walker et al. | |
| 6,131,087 A | | 10/2000 | Luke et al. | |
| 6,134,534 A | | 10/2000 | Walker et al. | |
| 6,260,024 B1 | * | 7/2001 | Shkedy ....................... | 705/26 |
| 6,321,211 B1 | * | 11/2001 | Dodd .......................... | 705/26 |
| 6,324,522 B2 | * | 11/2001 | Peterson et al. ............. | 705/28 |

(Continued)

FOREIGN PATENT DOCUMENTS

JP        2002342622 A  * 11/1999

(Continued)

OTHER PUBLICATIONS netCOMPONENTS web site Feb. 2, 1999 [online], [retrieved on Jul. 1, 2004]. Retrieved from the Internet: <URL:http://web.archive.org/web/19990202143053/www.netcomponents.com/netinfo.html>.*

(Continued)

*Primary Examiner*—Romain Jeanty
(74) *Attorney, Agent, or Firm*—Manuel R. Valcarcel, Esq.

(57) ABSTRACT

A method and system for buyers and sellers of goods/services to engage in commerce, providing to a searchable seller goods/services information database to search for desired items and allowing buyers of goods/services to select between at least one direct sales channel and at least one indirect sales channel for submitting a request for quotation and/or completing a transaction, to transmit requests for quotation to selected sellers, and for sellers to transmit quotations to buyers in response to requests for same.

5 Claims, 3 Drawing Sheets

U.S. PATENT DOCUMENTS

| | | | | |
|---|---|---|---|---|
| 6,360,205 | B1* | 3/2002 | Iyengar et al. | 705/5 |
| 6,535,857 | B1* | 3/2003 | Clarke et al. | 705/28 |
| 6,643,624 | B2* | 11/2003 | Philippe et al. | 705/26 |
| 6,993,572 | B2* | 1/2006 | Ross et al. | 709/218 |
| 2001/0032163 | A1* | 10/2001 | Fertik et al. | 705/37 |
| 2001/0047311 | A1* | 11/2001 | Singh | 705/26 |
| 2001/0047329 | A1* | 11/2001 | Ashby | 705/39 |
| 2002/0147674 | A1* | 10/2002 | Gillman | 705/37 |
| 2003/0014326 | A1* | 1/2003 | Ben-Meir et al. | 705/26 |

FOREIGN PATENT DOCUMENTS

WO    WO-99/51051 A1 *  8/2000

OTHER PUBLICATIONS netCOMPONENTS web site Jul. 1, 2004 [online], [retrieved on Jul. 1, 2004]. Retrieved from the Internet: <URL:http://www.netcomponents.com/results.htm?d=1&t=f&r=1&pn1=8625>.*

Trivedi, Minakshi, Distribution Channels: An Extension of Exclusive Retailership, Jul. 1998, Management Science, vol. 44, No. 7, pp. 896-909.*

Zarley, Craig et al., Industry Moves to Integrated Distribution, Apr. 5, 1999, Computer Reseller News, Issue 836, p. 1.*

Franse, Karen, Channel Assembly, White Box and the Direct vs. Indirect Battle, Dec. 7, 1998, VARBusiness, vol. 14, Issue 26, p. 88.*

Dilger, Buying strategies, Nov. 1998, Manufacturing Systems, v.16 n.11, p. 68 [online] [accessed Jun. 11, 2005 via ProQuestt database], ( 5 pages).*

Corvino, Streamlining public purchasing through e-catalogs, Feb. 2000, v.16, n.1, p. 13-17 [online ] [accesed Jun. 11, 2005 via Dialog database File 553], (7 pages).*

Hussain, Embracing the new economy, Aug. 16, 1999, Malaysian Business, p. 52 [online] [accessed Jun. 11, 2005 via Dialog database File 619], (3 pages).*

"Exploring Alternatives-A Growing Number of Sites Offer a Variety of Services, Ranging from Online Auctions to Detailed Catalogs to Comparative Technical Data", Electronic Buyers News, 1999, n1168.*

* cited by examiner

| Search Results for: 72XWR1K* | | | | 7 line items found. | | |
|---|---|---|---|---|---|---|
| 72XWR1K | BI | 72XWR1K | 9/1/00 | US | 898 | Quest Components |
| 72XWR1K | BI | | 8/28/00 | US | 41 | Reliance Merchandizi |
| 72XWR1K | | | 7/25/00 | US | 7 | ACP Components |

7 line items found.    🛒 Add to brokerage service shopping cart.

METHOD AND SYSTEM FOR PROVIDING DIRECT AND INDIRECT SALES CHANNELS FOR GOODS OR SERVICES FROM A SINGLE POINT OF PURCHASE

PRIOR U.S. APPLICATION

This Specification is based on U.S. Provisional Application Ser. No. 60/200,370 filed on Apr. 28, 2000. The inventor claims the benefit of Title 35, Section 119 of the U.S. Code based on said provisional application.

BACKGROUND OF THE INVENTION

1. Field of the Invention

The present invention relates to a method and system for buyers and sellers of goods or services to engage in commerce. More specifically, the present invention relates to a method and system for requesting, quoting, selling and purchasing goods or services through a user interface, such as a web browser, providing users with the option of selecting direct or indirect sales channels for goods or services from a single point of purchase.

2. Description of Background Art

Buyers in need of goods and services often spend considerable time locating an appropriate vendor. Buyers typically use trade publications, directories, recommendations, and other means to locate vendors. If the type of vendor needed is in a foreign country, the problem compounds. Vendors advertise through various media and by direct sales methods to make known to potential buyers what they sell and how to contact them. Once a buyer identifies a few vendors, each must be contacted to obtain product or service price and availability information. In addition, when buyers must sell surplus inventory from time to time they must advertise, cold call, sell to brokers or the like. These processes are costly, require experienced personnel and are time consuming for most businesses.

The market for goods and services in various industries is becoming increasingly global, with orders for such goods or services originating from several countries. It is, therefore, desirable to provide a quick and efficient way to order products or services through a global network of computers, such as those connected to each other via the Internet. The Internet is a collection of interconnected (public and/or private) networks that are linked together by a set of standard protocols, such as TCP/IP (Transmission Control Protocol/Internet Protocol to form a global, distributed network. While this term is intended to refer to what is now commonly known as the Internet, it is also intended to encompass variations which may be made in the future, including changes and additions to existing standard protocols.

Online transactions are fairly cheaper than traditional channels and means of doing business. For example, a bank may charge on average one dollar for each transaction (such as every day transactions, from verifying the balance of a checking or savings account, to withdrawal of money from a local bank), versus an average of seven cents that it costs to do the same transaction on an online bank. For this reason, Internet and online trading is expected to grow significantly.

Vendors seeking to utilize the Internet to sell their products or services have provided buyers with direct access to a database of their products or services through the Internet. This practice has been utilized with various types of businesses, for instance, in the electronic components industry. For example, large corporations, such as IBM and Motorola, have direct access to databases and the sales systems of their respective suppliers and distributors for satisfying their procurement needs. The prior art describes computerized shopping systems which employ some kind of central database of goods and services offered to buyers. Information about the goods and services offered is stored centrally. In such systems a vendor provides its database of goods and/or services to a buyer who orders items from the vendor's database. It is analogous to walking into a vendor's store and selecting items from the vendor's available stock.

In other prior art systems a number of vendors combine to offer their collective inventory to buyers through individual databases or a combined database of available goods or services. In yet another existing system a primary seller, such as an insurance agency, offers to provide to buyers premium quotations from the insurance carriers for which the agency is an agent.

Two methods of offering goods or services over the Internet are the direct ordering model and the indirect ordering model. As referred to herein, a "direct" ordering model involves dealing directly and non-anonymously with the entity that actually owns stock on the goods or services, such as a stocking distributor or a manufacturer. In the direct ordering model, a buyer requests quotations from and/or purchases a line-item or a group of line-items directly from a stocking seller. More specifically, after completing a search in a goods or service database, the buyer is provided with search results on a display. Each search result line-item provides information about the queried item, including the identity of the stocking distributor.

Another type of product or service ordering method utilizes an indirect sales channel. One such indirect sales channel may be provided via a brokerage service. Other examples of indirect sales channels might include an agent service, market-maker service, or any other named service that sources and/or purchases from a seller and resells to a buyer. As referred herein, a brokerage service is often used to exemplify an indirect sales channel and includes any service that involves brokering a deal between a buyer and a seller. Under one exemplary model, a broker charges a price markup for buying goods from a seller and, in turn, reselling them to a buyer. Typically, direct- and indirect-ordering models are viewed as inconsistent and non-complimentary business models, not to be presented together in a business's revenue stream. As a result, direct and brokerage sale models have been applied mutually exclusive of each other. Businesses that offer part search results either enable the SKU (stock keeping unit) line item purchase through direct sale or through brokerage sale, but do not offer both options for every line item. In other words, businesses that offer line item SKU's using a brokerage model avoid using a direct model on these same line items because it is viewed as cannibalizing from the brokerage sale revenue stream. Conversely, businesses that offer line item SKU's using a direct model avoid a brokerage model on these same line items, because it is viewed as detracting from the direct sale revenue stream.

In either the direct or indirect ordering models, products or services may be ordered over the Internet by paying a membership and/or transaction fees. In a typical prior art system, a website enables member buyers to search for electronic component part number(s) that they are trying to locate on the database of aggregated distributor inventories. Upon executing the search, the website currently provides the buyer with results showing them the corresponding distributors names that have stock on line-items. The buyers can then click on the distributor name to retrieve their contact information, and contact them directly to request a quotation using traditional methods.

The following sites provide the distributor name on some or all line-items. However, these sites do not provide a link that provides online pricing and/or order entry ("transaction"/ "shopping cart program") either via communication with or at the distributor's own web site. Additionally, none of these sites provide brokerage services:

Services such as those operating under the names Broker Forum ChipSource; Electronet Supply View; IC Source Microline; ChipCenter and CNET offer links such that after user has selected an item to buy, online pricing and/or order entry is provided ("transaction"/"shopping cart program") either via communication with or at the distributor's own web site. However, these sites also do not offer a brokerage service. The need2Buy site provides a reverse auction whereby a user can submit RFQ's (Requests for Quotation) and get back competitive bids from some select distributors and/or their own brokerage service, but fails to provide the name of the distributor associated with each line-item. PartMiner provides the distributor name on some line-items. On some line-items, this site provides a link for their brokerage service. However, this site does not offer the name of distributor associated with each line-item.

Providing an indirect purchase method option and direct purchase method option together for each line-item in a single point of purchase (POP) has not been done in the past. This is because, as noted previously, businesses have traditionally been interested in securing revenues from one revenue stream or the other and have not been interested in giving the buyer the choice a buying method that suits their need.

The present invention provides a sourcing tool for purchasers of various goods, including, by way of nonlimiting example, for industrial purchasers of electronic components. The system of the present invention offers a search engine for searching for line-items from distributors of electronic components worldwide. The system of the present invention also allows purchasers to select between an indirect purchase method and a direct purchase method for each line item offered from a single point of purchase. The system of the present invention optionally further provides the ability for purchasers to generate automated quotation requests for selected components.

Buyers or sellers may use the system of the present invention by filling out an HTML registration form. After the registration form is submitted, the buyer or seller is given an account number to login and use the system. Sellers may, for example, upload their inventory information to the system database. In the registration form, the sellers may select the type of distributorship they represent. After registering with the system, the sellers can upload their inventory listing via e-mail, online upload, diskette, or a variety of other methods. Buyers can search the system's database for inventory information from franchised and independent distributors.

SUMMARY OF THE INVENTION

The method of the present invention provides access to a searchable seller product/service information database to search for desired items; provides buyers with the option of purchasing goods/services through at least one direct sales channel and one indirect sales channel; provides for receiving requests for quotation for goods and/or services from buyers; selects one or more appropriate vendors, whether direct distributors or indirect providers such as brokers, to receive the buyer's request for quotation based on filter conditions, if any, set by the buyer, vendor and the system software; sends the buyer's request for quotation to said selected vendors; and processes vendors'quotations submitted in response to such requests. Requests for quotation and responses to same can be communicated directly to and from the buyer and the seller selected from the system database, or, alternatively, indirectly through the system. According to another aspect the present invention, a buyer at the single point of purchase is provided with the option of purchasing goods or services offered by multiple sellers by linking directly to each sellers ordering system and accessing price and inventory data.

The system of the invention is implemented via a computer system that communicates information over a network, such as the Internet. The computer system is programmed to run all necessary software, such as search and database applications or search and data-mining applications, for achieving the purpose of the invention.

The system of the present invention processes requests for quotation for goods and/or services through one or more central processing units, said system comprising operating system software for controlling said one or more central processing units and storage means containing one or more databases with appropriate identity and other information about members of the network and the goods and services available, one or more servers providing for Internet-based access and use of the system by sellers to upload their inventory data, request for quotation filtering conditions and means for responding to requests for quotations means for buyers to search the system's seller and product/service databases and submit requests for quotation, means for potential buyers of goods or services to select between a direct and indirect sales channel for each transaction, means for potential buyers to transmit requests for quotation to system's said central processing unit, means for said system's central processing unit to transmit requests for quotation to selected system network vendor members, means for said vendor members to transmit quotations to the requesting potential buyers in response to their requests for same.

The present invention provides for ordering of goods or services by simultaneously providing buyers of offered goods or services with the option of purchasing goods or services through at least one direct sales channel and one indirect sales channel, for example, from a brokerage service. Thus, the invention provides the advantages of full freedom of choice to a buyer with regard to a desired purchasing method by which to request for quoted in connection with a selected product or complete a purchase transaction. The buyer can choose to buy direct, in an unbiased, non-anonymous, and vendor-neutral model for negotiating the best price possible from the vendor of their choice. Conversely, the buyer can choose to place the order through a brokerage service, for example, to acquire goods located in another part of the world or to combine multiple goods from different locations in one order, while aware that the purchase price is marked up for brokerage commission. In this way, the system of the present invention gives the buyer the ability to make a conscious and informed decision on whether the brokerage service's logistics, terms, and/or kitting advantages outweigh the pricing advantages of buying directly.

A further advantage of the invention lies in providing the buyers with the ability to, not only source directly, but to immediately execute an order from participating distributors. Further, the present invention provides for multiple orders directly through corresponding purchasing systems of several distributors at a single point-of-purchase, e.g., a buyer's client station. In the alternative, the invention enables a buyer, through the brokerage service, to buy from another source in which they might feel more comfortable because of location, terms, ISO9002 (International Organization of Standardization Quality Certification No. 9002) classification, kitting ability, minimizing supplier base, and/ or any other reasons.

DESCRIPTION OF DRAWINGS

FIG. 3 is a sample website screen of the system of the present invention showing product line items with SKU's and other information, as well as the option to select from at least one direct sales channel and at least one indirect sales channel.

DESCRIPTION OF A PREFERRED EMBODIMENT

Figure 1:
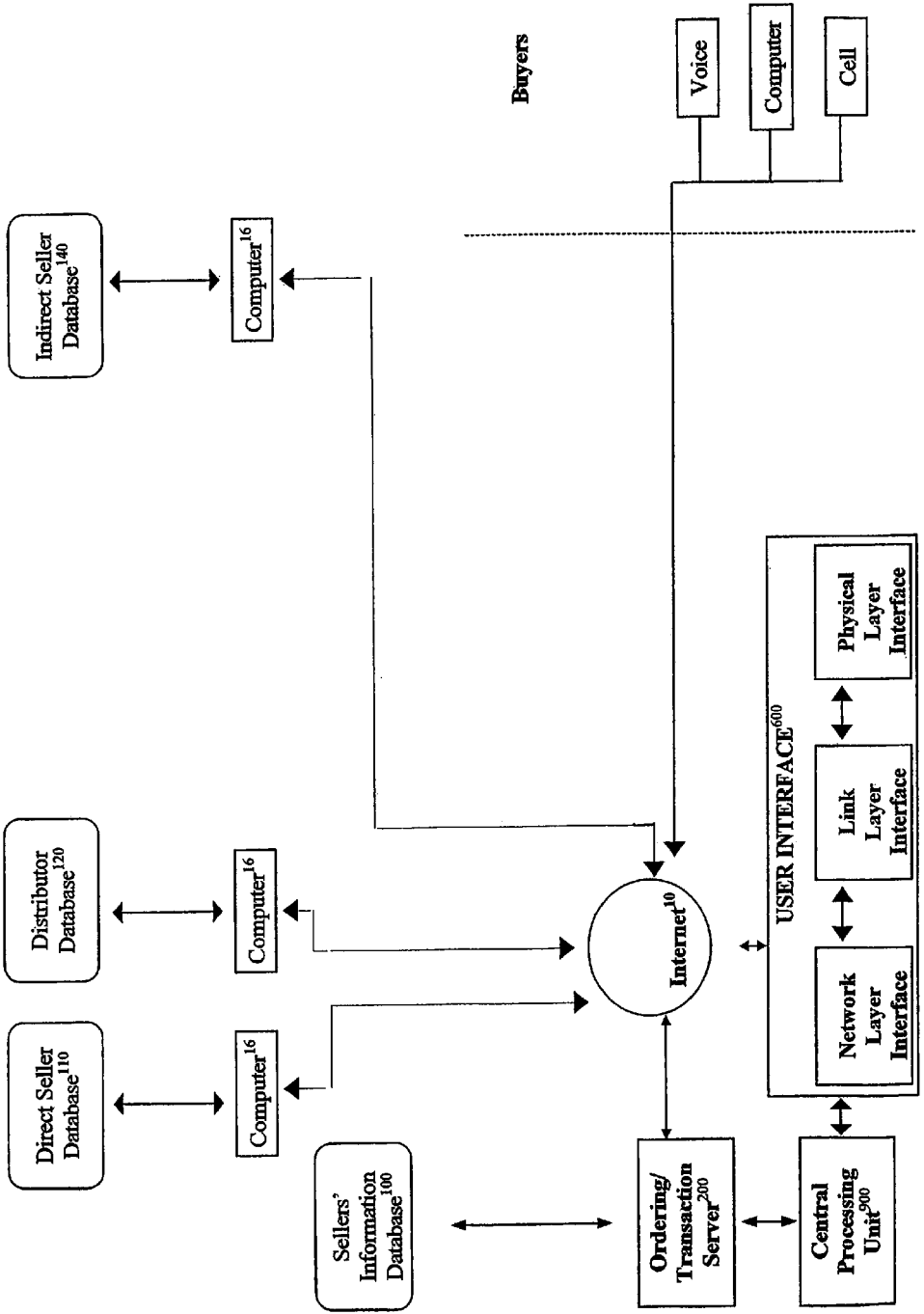
FIG. 1 is a block diagram of the system of the present invention in a preferred embodiment.

FIG. 1 shows a block diagram of a preferred embodiment of the system that implements the present invention.

Communication between buyers, sellers and the network computer(s) is completed using the Internet. A world wide web home page is set up to provide access to the network by Internet members. A potential user accesses the Internet using any standard web browser and becomes a quotation network user by completing a registration application providing necessary data about itself. Once registered, a member can access the forms necessary for preparing an RFQ. The RFQ is sent to the system through the system server.

As shown in FIG. 1, a seller information database 100 is connected through a server 200 to a network, such as the Internet 10. In this way, the Internet provides buyers with access to the sellers via the system. Sellers provide their product/service inventory database information (via direct seller database 110, distributor database 120 or indirect seller database 140, as applicable based on the type of seller) to the system via the Internet 10 using computer terminals 16. Both direct sales channels and indirect sales channels are provided. A buyer interfaces with the system via a user interface 600, such as one that is developed using a well-known markup language protocol, e.g., HTML (Hypertext Markup Language). In this way, buyers can access the seller information database and that of the distributors.

Figure 2:
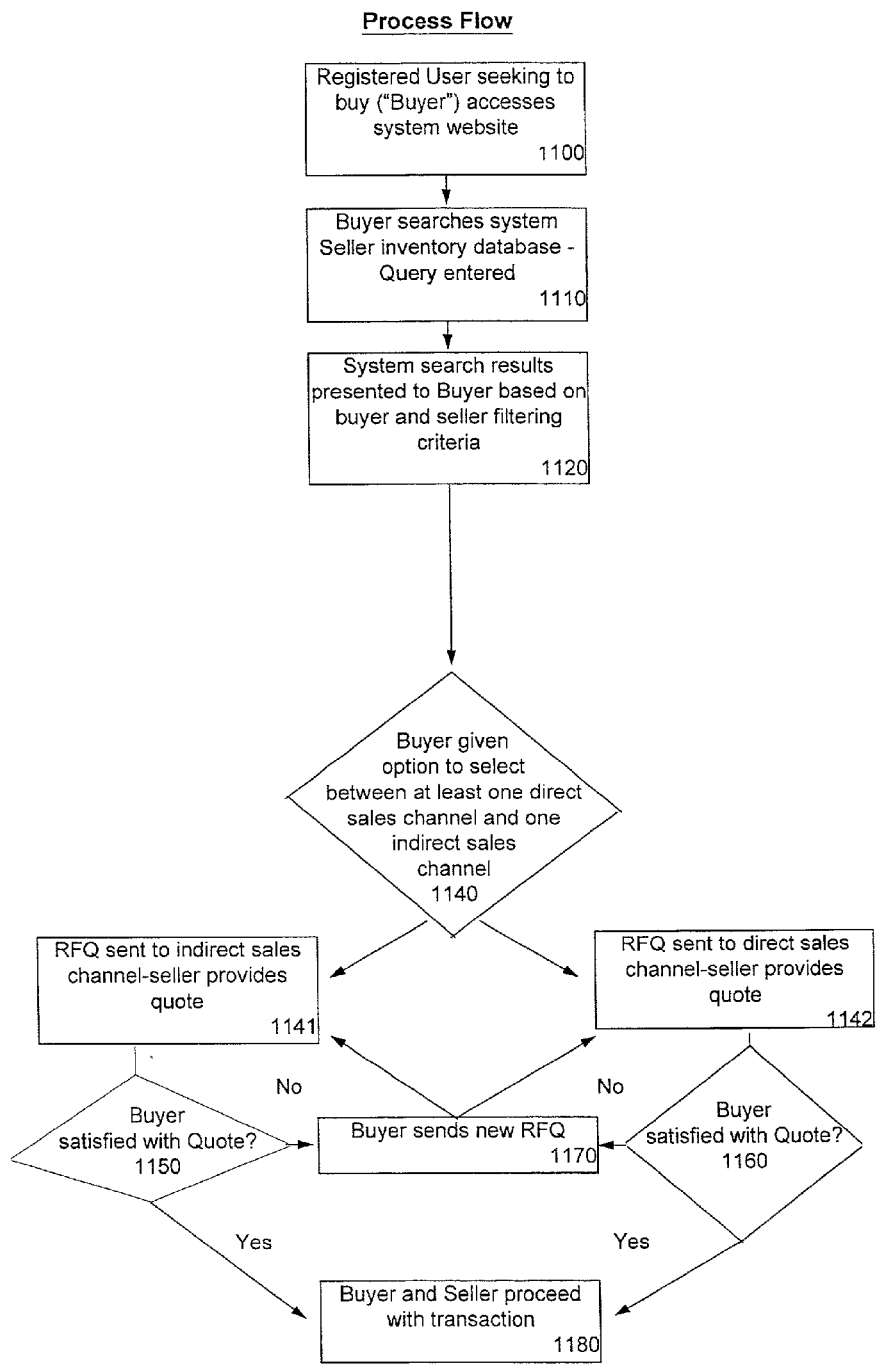
FIG. 2 is a flow chart showing the information process flow of the method of the present invention in a preferred embodiment.

Referring now to FIG. 2, which is a flow diagram showing the overall process flow of the method of the present invention in a preferred embodiment, the method of the present invention begins when registered buyers interact with the system by accessing the system website 1100 and the seller information database provided therein to search for desired items 1110. After completing the search, the buyers are provided with a list of available distributors based on buyer and seller filtering criteria 1120. The list provides a link to information on a distributor, and the option of either direct purchase from the distributor or purchase through a brokerage service 1140.

The buyer can then select the distributor name to retrieve distributor contact information, and contact them directly to request a quotation, or "RFQ," using traditional methods such as telephone, fax, e-mail RFQ, or purchase directly from the distributor. If unfavorable terms are offered and/or for any other reason, the buyer may alternatively select a brokerage service to facilitate quotation request and/or purchase and accommodate the needs of the buyer. For instance, if a brokerage service's logistics, terms, and/or kitting are advantageous for the buyer they may outweigh the pricing advantages of buying direct. If the RFQ is sent to an indirect sales channel, the seller/broker provides a quotation in response 1141. The same process occurs if the RFQ is sent to a direct sales channel 1142. If the buyer is satisfied with the quote, 1150 and 1160, the transaction proceeds 1180. Otherwise, the buyer can submit new RFQ's to potential sellers 1170.

In one embodiment of the invention, a buyer, upon receiving a response to a request for quotation, provided with the option of purchasing goods or services offered by multiple sellers by linking directly to each seller's ordering system and accessing price and inventory data.

New vendors and users may apply for membership online via the system website. New members would receive password information via e-mail to ensure that they have provided correct e-mail coordinates.

Standardization of product or service descriptions is done to avoid confusion. To this end preprogrammed menu information can be provided to classify products and services in categories broken down by functional class and subclass corresponding to the products as they are commercially known and identified. Such menus can be readily upgraded to include new and revised commercially available products and services from the manufacturers or suppliers of such products and services.

Buyers typically include buyers from original equipment manufacturers ("OEM's"), contract electronic manufacturers/contract assembly house's "(CEM's"), independent distributors/brokers, and other entities. Distributors typically include franchised distributors and stocking independent distributors. Since the website is published and marketed in many languages, buyers and distributors can use it worldwide.

FIG. 3 depicts a sample system website screen presenting a potential buyer's search results, showing items available and providing at least one direct purchasing channel 30 and one indirect purchasing channel 50.

The system provides a method of requesting quotations, ordering, purchasing, selling or otherwise transacting business associated with electronic components over the Internet. However, the present may equally apply to other goods or services. As stated above, according to one of the features of the present invention, buyers are provided with an option to either purchase the goods or services directly from a seller, e.g., a distributor that has stock, or to purchase such items through a brokerage service. The invention uses a search results screen that displays, among other things, the name of the stocking distributor associated with each line-item and a link that brings up a distributor profile screen with contact information so that the buyer can get in touch with the distributor directly. Also displayed may be an icon, or any other link, next to the displayed distributors names that provides online pricing and/or order entry (commonly referred to as "transaction" or "shopping cart programs") either via communication with or at the distributor's own web site. This could link a buyer into a distributor order entry system, whereby the buyer could quickly get pricing information and submit order. The present invention also provides an icon, or any other link, on each line-item, enabling the buyer to submit, or add that particular line-item to a "shopping cart" program for the purpose of submitting, an RFQ, via e-mail, online, or any other method, to a brokerage service.

According to some of the more detailed features of the invention, different options and sets of options can be associated with different classifications of buyers. For example, if the buyer is an OEM buyer, they might be provided with options of direct purchase, brokerage purchase or both. On the other hand, if the buyer is a distributor/exporter/reseller, they might be provided with only direct sale option. Furthermore, the system can provide different levels of information as options and sets of options to different classifications of buyers.

While the present invention has been shown and described herein in what is considered to be a preferred embodiment there of, illustrating the results and advantages over the prior art obtained through in the present invention, the invention is not limited to the specific embodiments described above. Thus, the forms of the invention shown and described herein are to be taken as illustrative and other embodiments may be selected without departing from the spirit and scope of the present invention.

Having thus described the invention, what is claimed is:

1. A system for buyers and sellers of goods/services to engage in commerce, comprising one or more central processing units, system software for controlling said one or more central processing units, system storage means containing one or more system databases with information regarding buyers and sellers and the goods/services available, one or more servers providing for Internet-based access and use of said system by sellers to upload their goods inventory data and respond to requests for quotation, means for buyers of goods/services to select, from a single point of purchase, between at least one direct sales channel, wherein said buyers purchase-goods/services by interacting directly with said sellers, and at least one indirect sales channel, wherein said buyers can purchase-goods/services without direct interaction with said sellers, via an intermediary that acquires said goods/services from said sellers and resells said goods/services to said buyers, means for providing, at said single point of purchase, information regarding terms of purchase via said at least one direct sales channel and regarding terms of purchase via said at least one indirect sales channel for said buyers to compare and evaluate which of said sales channels provides better purchase terms for the same goods/services, means for buyers to transmit requests for quotation to said system, means for said system to transmit requests for quotation to selected sellers, means for sellers to transmit quotations to buyers in response to requests for same.

2. The system of claim 1, further comprising means for buyers to purchase goods/services by linking directly to seller ordering systems.

3. A method for buyers and sellers of goods/services to engage in commerce, comprising the steps of: providing access to a searchable seller goods/services information and inventory database to search for desired items; providing sellers to upload goods inventory data and respond to requests for quotation, providing to buyers, from a single point of purchase, at least one direct sales channel for said buyers to purchase goods/services interacting directly with said sellers, and at least one indirect sales channel for said buyers to purchase goods/services without direct interaction with said sellers, via an intermediary that acquires said goods/services from said sellers and resells said goods/services to said buyers from a single point of purchase, providing, at said single point of purchase, information regarding terms of purchase via said at least one direct sales channel and regarding terms of purchase via said at least one indirect sales channel for said buyer to compare and evaluate which of said sales channels provides better purchase terms for the same goods/services; receiving requests for quotation for goods/services from buyers; sending said requests for quotation to selected sellers; and processing seller quotations submitted in response to said requests for quotation.

4. The method of claim 3, further comprising the step of providing buyers with a direct link to seller ordering systems.

5. The method of claim 3, further comprising the step of selecting appropriate sellers to receive said requests for quotation based on filter conditions provided by buyers or sellers.

* * * * *